United States Patent [19]

Segger

[11] Patent Number: 4,736,264
[45] Date of Patent: Apr. 5, 1988

[54] PRIMARY SWITCHED-MODE POWER SUPPLY UNIT

[75] Inventor: Bernd Segger, Erlangen, Fed. Rep. of Germany

[73] Assignee: Siemens Aktiengesellschaft, Berlin and Munich, Fed. Rep. of Germany

[21] Appl. No.: 855,534

[22] Filed: Apr. 23, 1986

[30] Foreign Application Priority Data

May 23, 1985 [DE] Fed. Rep. of Germany ....... 3518594

[51] Int. Cl.$^4$ .............................................. H02H 7/00
[52] U.S. Cl. ...................................... 361/18; 361/91; 361/93; 323/285
[58] Field of Search ...................... 361/18, 57, 87, 93, 361/98; 323/277, 285; 363/56, 21, 28, 95

[56] References Cited

U.S. PATENT DOCUMENTS

| | | | |
|---|---|---|---|
| 4,236,187 | 11/1980 | Mochizuki et al. | 361/36 |
| 4,414,598 | 11/1983 | Nowell | 361/18 |
| 4,453,193 | 6/1984 | Haung et al. | 361/93 X |
| 4,495,537 | 1/1985 | Laude | 361/98 |
| 4,513,341 | 4/1985 | Kollanyi | 361/18 X |
| 4,561,047 | 12/1985 | De Puy | 361/18 X |
| 4,562,548 | 12/1985 | Andersen et al. | 361/18 X |

FOREIGN PATENT DOCUMENTS 2845163 4/1979 Fed. Rep. of Germany .

Primary Examiner—A. D. Pellinen
Assistant Examiner—Derek S. Jennings
Attorney, Agent, or Firm—Lawrence C. Edelman

[57] ABSTRACT

A primary switched-mode power supply unit having an auxiliary power supply for a control unit controlling a primary power circuit breaker connected in series with a first primary winding and a primary voltage regular connected to the control unit. The auxiliary power supply has a secondary primary winding across which a series circuit of a diode and a capacitor is connected. A current limiting circuit breaker is connected between the auxiliary voltage input of the control unit and a ground, the actuating input of said current limiting circuit breaker being connected to an output of an overcurrent controller.

8 Claims, 1 Drawing Sheet

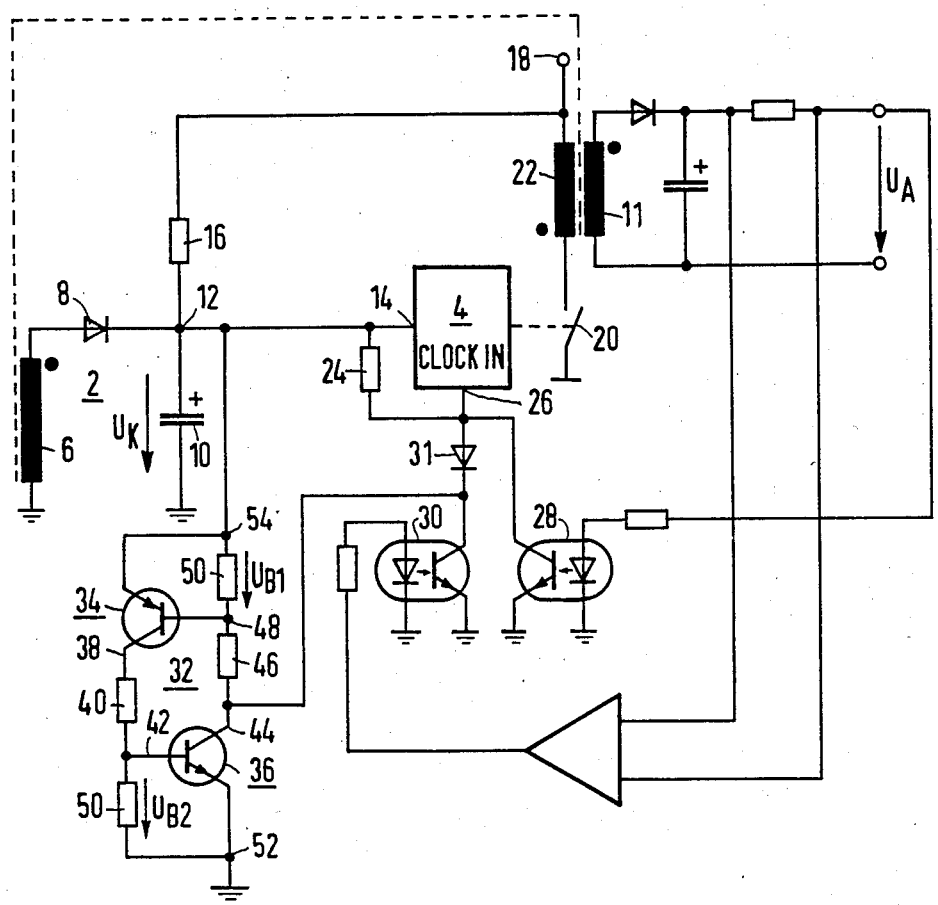

PRIMARY SWITCHED-MODE POWER SUPPLY UNIT

FIELD OF THE INVENTION

The invention relates to d.c. power supplies and more particularly to a primary switched power supply having connected to the primary circuitry an auxiliary power supply for a control unit of a circuit breaker connected in series with the primary winding and also connected to the primary circuitry is a voltage controller for controlling the supply during overcurrent conditions.

BACKGROUND OF THE INVENTION

In a primary switched-mode power supply which is commercially available, the output of said primary switched power supply is not protected by means of overvoltage or overcurrent sensitive components. Said power supply is protected only against short-circuits, since in case of a short-circuit the in-phase winding of the auxiliary power supply of the control unit is also shorted by means of the magnetic mutual coupling. Thus, in case of a short circuit, the control unit is turned off after a predetermined time. Upon occurrence of an overcurrent, the auxiliary power supply remains on and thus, by virtue of the magnetic mutual coupling of the in-phase winding with the secondary circuit, the control unit remains on, so that in the primary winding circuitry the primary power duty cycle is increased, instead of being reduced or turned off as it should be.

SUMMARY OF THE INVENTION

It is an object of this invention to provide a primary switched-mode power supply unit having in the primary circuitry an auxiliary power supply, with overvoltage protection and/or overcurrent protection provided by simple means.

Briefly stated in accordance with one aspect of the invention, the foregoing objects are achieved by providing a primary switched-mode power supply unit having an auxiliary supply for a control unit controlling a power circuit breaker connected in series with a first primary winding, and a primary voltage regulator connected to the control unit, said auxiliary supply having a secondary primary winding across which a series circuit of a diode and a capacitor is connected. The switching power supply also comprises a current-limiting circuit breaker connected between an auxiliary voltage input of the control unit and a ground, and an actuating input of said current-limiting circuit breaker connected to an output of a primary controller.

The primary switched-mode power supply has connected to its primary winding circuitry an auxiliary power supply with a current limiting electronic circuit breaker in accordance with the invention. The current limiting circuit breaker becomes conductive as soon as a primary voltage controller is triggered. Thus, the clock input of the control unit for the primary winding switching device is connected to ground and the current limiting circuit breaker is switched on. The current limiting circuit breaker remains on until the capacitor voltage of the auxiliary power supply has fallen below a predetermined threshold voltage, i.e., the capacitor and the in-phase winding of the auxiliary power supply are shorted by means of the current limiting circuit breaker. Below said threshold voltage the current limiting circuit breaker opens and the control unit of the primary switching device is switched on again. If the cause of the overcurrent has not been remedied in the meantime, the current limiting circuit breaker is switched on by means of one of two voltage controllers. As a result, a primary switched-mode power supply with a primary switched overcurrent limitation is obtained by simple means.

As a simple current limiting circuit breaker a pnp transistor and an npn transistor combination is provided: each of the collectors is connected to the base of the other transistor via a collector resistor. A base-to-emitter resistance is also provided for each transistor. The emitter of the pnp transistor is connected to the auxiliary voltage input of the control unit, and the emitter of the npn transistor is connected to ground. As soon as the second of two primary voltage controllers is triggered, a base voltage is applied at the base of the pnp transistor with the help of the voltage divider so that the pnp transistor becomes conductive. Thus, a voltage appears at the base of the npn transistor as well, which switches said transistor on. Even if the second primary voltage controller is no longer triggered, the composite current limiting circuit breaker remains switched on until the capacitor voltage of the capacitor of the auxiliary power supply has fallen below a threshold voltage. Thus, a primary switched-mode power supply unit is obtained by which in the event of a fault the values of an overcurrent or of an overvoltage are substantially reduced as a result of the switching of the current limiting circuit breaker.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying drawings in which the FIGURE schematically illustrates a primary switched-mode power supply unit having connected to the primary an auxiliary power supply.

DESCRIPTION OF A PREFERRED EMBODIMENT

The illustrated embodiment shows a primary switched-mode power supply circuit having an auxiliary power supply 2 for a control unit 4 connected to the primary circuitry. The auxiliary power supply 2 contains an in-phase winding 6, a diode 8 and a capacitor 10. The in-phase winding 6 is magnetically coupled to a secondary winding 11 of the transformer of the switching circuit. Furthermore, the series circuit consisting of the diode 8 and the capacitor 10 is connected in an electrically parallel manner across the in-phase secondary winding 6. The junction point 12 of the diode 8 and the capacitor 10 is connected to the auxiliary voltage input 14 of the control unit 4. The junction point 12 is also connected by an initiating resistance 16, to the positive primary input terminal 18. The output of said control unit 4 acts on a primary power switching device or circuit breaker 20 as the controlled switching device which is connected in series with the primary winding 22 of the switching circuit transformer. The auxiliary voltage input 14 of the control unit 4 is furthermore connected, via a resistance 24, to the clock input 26 of the control unit 4. A first primary voltage controller 28 and a second controller 30 are also connected to the clock input 26, with both controllers 28 and 30 being electrically connected to each other by means of a decoupling diode 31 in such a manner that the first primary voltage controller 28 has no action on the second primary controller 30 or the trip input of a current limiting circuit breaker 32. Opto-isolators are provided as the controllers 28 and 30 which in the unilluminated state set the duty cycle of the controlling pulse to its maximum value.

A pnp transistor 34 and a npn transistor 36 are interconnected as the current limiting circuit breaker 32. The collector 38 of the pnp transistor 34 is connected via a resistance 40 to the base 42 of the npn transistor 36, whose collector 44 is likewise connected via a collector resistance 46 to the base 48 of the pnp transistor 34. A base-to-emitter resistance 50 is also provided in each case. The emitter 52 of the npn transistor 36 is connected to ground, and the emitter 54 of the pnp transistor 34 is connected to the junction point 12 of the diode 8 and the capacitor 10. The collector 44 of the npn transistor 36 is furthermore connected to the output of the second primary controller 30, with the collector 44 being simultaneously provided as the trip input of the current limiting circuit breaker 32. The base-to-emitter resistance 50 and the collector resistance 46 or the base-to-emitter resistance 50 and the collector resistance 40 form, in each case, a voltage divider whose resistance values are determined as functions of the capacitor voltage $U_K$ of the capacitor 10 and of the base voltage $U_{B1}$ and $U_{B2}$ of the transistors 34 and 36. At a capacitor voltage $U_K$ of approximately 10 V, the resistance ratio of the base-to-emitter resistance 50 to the collector resistance 46 or 40 is approximately 1:9.

In the steady-state operating condition, the output voltage $U_A$ of the primary switched-mode power supply circuit is held constant by means of the first primary voltage controller 28, the control unit 4 and the primary switching device 20. The duty cycle of the control unit 4 is set by means of the first voltage controller 28, and the control unit 4, in turn, is held in the switched-on state by the auxiliary power supply 2.

Upon occurrence of an overcurrent on the secondary side of the switched-mode power supply, said overcurrent is detected with the help of a comparator, not illustrated in greater detail, and is transmitted, by means of the opto-isolater which is used as the second primary controller 30, to the primary side of the power supply unit. The potential of the clock input 26 of the control unit 4 is thus lowered to the point that said potential falls below the threshold voltage of the clock input 26. Thus, the duty cycle for the primary switching device 20 becomes zero immediately and the transformer of the primary switched-mode power supply unit is blocked. As a consequence, the supply of energy to the auxiliary power supply 2 via the in-phase secondary winding 6 is also cut off. Furthermore, the trip input of the current limiting circuit breaker 32 is set to approximately zero volts. In this way, the capacitor voltage $U_K$ occurs at the voltage divider consisting of the collector resistance 46 and the base-to-emitter resistance 50 so that a partial voltage $U_{B1}$ appears across the base-to-emitter resistance 50, which switches on the pnp transistor 34. As a result, the capacitor voltage $U_K$ also appears at the voltage divider consisting of the collector resistance 40 and the base-to-emitter resistance 50. A partial voltage $U_{B2}$ also appears across the base-to-emitter resistance 50, which switches on the npn transistor 36. In this way, the in-phase end of winding 6 and the capacitor 10 are shorted so that the energy stored therein is discharged to ground. The current limiting circuit breaker 32 remains switched on until the capacitor voltage $U_K$, in particular the partial voltages $U_{B1}$ and $U_{B2}$, have fallen below a predetermined threshold voltage. When the current limiting circuit breaker again opens, an auxiliary voltage is generated at the auxiliary voltage input 14 of the control unit 4 with the help of the initiating resistance 16.

If the overcurrent is no longer present in the secondary circuit, said switching circuit reverts back to its steady-state operating condition without help from outside as soon as a predetermined value of an auxiliary voltage is present at the auxiliary voltage input 14 of the control unit 4. If, however, an overcurrent is still present in the secondary circuit of the primary switched-mode power supply circuit, then the second controller 30 responds again, by which means the duty cycle of the primary power switching device 20 is turned off and the current limiting circuit breaker 32 is turned on. As a result of the switching on and off of the current limiting circuit breaker 32, the value of the overcurrent, or even of a short-circuit current, is lowered at least to the value of the rated current.

It will now be understood that there has been disclosed an improved and simplified system for a primary switched-mode power supply unit with an overcurrent current protection. As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. A primary switched-mode power supply unit, comprising:
    an auxiliary supply providing operating voltage to an auxiliary voltage input of a control unit which controls a power circuit breaker connected in series with a first primary winding;
    a primary voltage regulator having an output providing an overvoltage control signal to the control unit, said auxiliary supply having a secondary primary winding across which a series circuit of a diode and a capacitor is connected;
    a primary current controller having an output providing an overcurrent control signal to the control unit; and
    a current-limiting circuit breaker connected between said auxiliary voltage input of the control unit and a ground, the closing of said current-limiting circuit breaker being responsive to said output of said primary current controller and the opening of said current-limiting circuit breaker being responsive to said operating voltage reaching a predetermined threshold;
    wherein the current-limiting circuit breaker includes a pnp transistor and an npn transistor, each having a collector connected by a respective collector resistance of the other transistor, and a base-to-emitter resistance connected between each transistor's base to its emitter;
    wherein the auxiliary voltage input of the control unit is connected to the emitter of the pnp transistor, and the emitter of the npn transistor is connected to the ground; and wherein the collector of the npn transistor comprises an actuating input for closing the current-limiting circuit breaker.

2. A primary switched-mode power supply unit according to claim 1, wherein outputs of the said primary voltage regulator and the primary current controller are connected to a clock input of the control unit.

3. A primary switched-mode power supply unit according to claim 1, wherein the outputs of said primary voltage regulator and said primary current controller are connected to each other by a decoupling diode.

4. A primary switched-mode power supply unit according to claim 1, wherein said primary voltage regulator and said primary current controller each comprise an opto-isolator.

5. A primary switched-mode power supply unit, comprising:
   a power circuit breaker coupled in series with a first primary winding;
   a control unit for controlling said power circuit breaker;
   an auxiliary power supply for supplying operating voltage to said control unit, said auxiliary power supply comprising a second primary winding across which a series circuit of a diode and a capacitor is coupled;
   a primary voltage regulator having an output coupled to provide an overvoltage control signal to said control unit;
   a primary current controller having an output coupled to provide an overcurrent control signal to said control unit; and
   a current-limiting circuit breaker coupled across said auxiliary power supply and having a trip input coupled to the output of said primary current controller for controlling its closing, its opening being controlled by the operating voltage of said auxiliary power supply reaching a predetermined threshold level.

6. A primary switched mode power supply unit according to claim 5, wherein the current-limiting circuit breaker includes a pnp transistor and an npn transistor, each having a collector connected by a respective collector resistance of the other transistor, and a base-to-emitter resistance connected between each transistor's base to its emitter.

7. A primary switched mode power supply unit according to claim 6, wherein said operating voltage is applied to an auxiliary voltage input of the control unit, said auxiliary voltage input being connected to the emitter of the pnp transistor, and the emitter of the npn transistor being connected to a ground of said auxiliary power supply.

8. A primary switched mode power supply unit according to claim 6, wherein the collector of the npn transistor comprises the trip input of the current-limiting circuit breaker.

* * * * *